United States Patent [19]

Inoue et al.

[11] Patent Number: 4,735,786

[45] Date of Patent: Apr. 5, 1988

[54] ADSORBENT FOR AND METHOD OF REMOVING IODINE COMPOUNDS

[75] Inventors: Takehisa Inoue, Tokyo; Hiromi Shiomi, Kawasaki, both of Japan

[73] Assignee: Toray Industries, Inc., Tokyo, Japan

[21] Appl. No.: 726,019

[22] Filed: Apr. 22, 1985

[30] Foreign Application Priority Data

Apr. 25, 1984 [JP] Japan .................................. 59-83407

[51] Int. Cl.$^4$ ............................................. C01B 7/00
[52] U.S. Cl. ..................................... 423/240; 423/241
[58] Field of Search ................. 502/60; 423/503, 241, 423/240 R

[56] References Cited

U.S. PATENT DOCUMENTS

| 3,033,642 | 5/1962 | Bukata et al. | 502/60 X |
| 3,382,039 | 5/1968 | Calmon et al. | 502/60 |
| 4,088,737 | 5/1978 | Thomas et al. | 423/241 X |
| 4,275,045 | 6/1981 | Anav et al. | 423/503 X |

FOREIGN PATENT DOCUMENTS

| 106674 | 4/1984 | European Pat. Off. | 502/60 |
| 2948515 | 6/1981 | Fed. Rep. of Germany | 502/60 |

*Primary Examiner*—Carl F. Dees
*Attorney, Agent, or Firm*—Austin R. Miller

[57] ABSTRACT

Iodine and iodine compounds are removed by using an adsorbent comprising a silver loaded pentasil zeolite.

11 Claims, No Drawings

ADSORBENT FOR AND METHOD OF REMOVING IODINE COMPOUNDS

BACKGROUND OF INVENTION (1) Field of the Invention

The present invention relates to an adsorbent for iodine and organic iodine compounds (hereinafter referred to as "iodine compounds" collectively). More particularly, it relates to an adsorbent for removing radioactive iodine compounds contained in exhaust gases.

(2) Description of the Related Art

To prevent environmental pollution, the discharge of radioactive substances into outer air is strictly controlled and, to this end, an emergency filter for removing radioactive iodine compounds is provided in a reactor building at a nuclear power plant to prevent the emission of radioactive iodine compounds at the time of an accident. Such a radioactive iodine compound-removing filter is also attached to the ventilation system of a reactor building. It is also required that a radioactive iodine compound-removing filter be provided when reprocessing spent nuclear fuel, or in a laboratory where a radioactive substance is used. Thus, the nature of an adsorbent for iodine compounds used for these purposes has become very important.

As the adsorbent for iodine compounds, there have been used iodine compound-impregnated active carbon and amine-impregnated active carbon.

The above-mentioned active carbon adsorbent is not costly but is defective in that the iodine compound-removing efficiency is reduced at a high temperature or under high humidity conditions. As an adsorbent having a removing capacity which is not reduced even under high humidity conditions, an adsorbent comprising a silver loaded X-type zeolite or mordenite has been developed [see U.S. Pat. No. 3,658,467 and Ceramics Japan, 16 (11), 927–928 (1981)].

However, this silver-zeolite adsorbent is very costly because silver is expensive and is contained in an amount as large as 20 to 40% by weight. Furthermore, the zeolite is extremely hydrophilic, and therefore, if the humidity is very high, the removing efficiency thereof becomes unsatisfactory under high humidity conditions.

Under this background, the development of a novel adsorbent containing a reduced amount of silver and exhibiting a high iodine compound-removing efficiency, even under high humidity conditions, is strongly desired.

SUMMARY OF THE INVENTION

It is, therefore, a primary object of the present invention to provide a novel adsorbent which exhibits a high iodine compound-removing efficiency even if the amount of silver loaded is small.

Another object of the present invention is to provide a novel adsorbent exhibiting a high iodine compound-removing efficiency even under high humidity conditions.

Still another object of the present invention is to provide a novel adsorbent which is advantageously used for reprocessing a spent nuclear fuel and having an adsorption efficiency which is reduced only to a slight extent with the lapse of time.

These objects of the present invention can be attained by an adsorbent for iodine compounds comprising a silver loaded pentasil zeolite.

Furthermore, these objects of the present invention can be attained by a method for removing iodine compounds from a gaseous stream, which comprises passing the gaseous stream containing iodine compounds through a layer of an adsorbent comprising a silver loaded pentasil zeolite, whereby the iodine compounds are adsorbed in the zeolite.

DESCRIPTION OF THE PREFERRED EMBODIMENTS

The pentasil zeolite used as an adsorbent in the present invention is a crystalline aluminosilicate zeolite having the following X-ray diffraction pattern:

| d(Å) | 100I/Imax |
|---|---|
| 11.2 ± 0.2 | s |
| 10.1 ± 0.2 | s |
| 3.86 ± 0.08 | vs |
| 3.72 ± 0.08 | s |
| 3.66 ± 0.08 | m |

The X-ray diffraction pattern is determined according to customary procedures. Namely, X-ray irradiation is carried out by K-α rays and a diffraction pattern is obtained by using a Geiger counter spectrometer provided with a recorder. From this diffraction pattern, the relative intensity 100I/Imax (Imax represents the maximum intensity) and the d spacing (angstrom; Å) are determined.

According to the present invention, iodine compounds can be removed at a high efficiency even under high humidity conditions by using an adsorbent comprising this silver loaded pentasil zeolite.

A pentasil zeolite used as an adsorbent in the present invention has the following general formula expressed in terms of molar fractions of oxides:

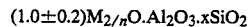

$$(1.0\pm0.2)M_{2/n}O\cdot Al_2O_3\cdot xSiO_2$$

wherein M represents a cation, n represents the valency of M, and x represents the molar ratio of silica to alumina.

The efficiency of the adsorbent for iodine compounds depends greatly on the molar ratio of silica to alumina (hereinafter referred to as "SiO$_2$/Al$_2$O$_3$") in the zeolite. If the SiO$_2$/Al$_2$O$_3$ molar ratio is smaller than 15, the efficiency varies greatly according to the humidity and the iodine compound-removing efficiency under high humidity conditions is insufficient, and the removal efficiency per unit weight of the silver loaded is reduced. Thus, the adsorbent becomes economically disadvantageous. If the adsorbent comprises a pentasil zeolite in which the SiO$_2$/Al$_2$O$_3$ molar ratio is at least 15, the removal efficiency per unit weight of the silver is increased and the adsorbent exhibits an excellent iodine compound-removing efficiency which is influenced to a lesser extent by the humidity.

However, if the SiO$_2$/Al$_2$O$_3$ molar ratio is too high, the amount of silver loaded is reduced and the efficiency for adsorbing iodine compounds is reduced. Accordingly, the SiO$_2$/Al$_2$O$_3$ molar ratio should be appropriately selected according to the conditions in which the adsorbent is to be actually used. Ordinarily, the SiO$_2$/Al$_2$O$_3$ molar ratio may be up to 100, but it is preferable that this molar ratio be about 20 to about 50.

The process for the preparation of pentasil zeolite used in the present invention is not particularly limited.

Ordinarily, the pentasil zeolite is prepared by forming a reaction mixture comprising a silica source, an alumina source, and an alkali source, and then crystallizing the reaction mixture under zeolite-forming reaction conditions. The composition of the aqueous reaction mixture comprising the silica source, alumina source, and alkali source is adjusted so that the following molar ratios are attained.

|  | Preferable range | More preferable range |
| --- | --- | --- |
| SiO$_2$/Al$_2$O$_3$ | At least 15 | 20 to 100 |
| H$_2$O/SiO$_2$ | 5 to 100 | 10 to 50 |
| OH$^-$/SiO$_2$ | 0.01 to 1.0 | 0.05 to 50 |

As the silica source, for example, silica sol, silica gel, silica aerogel, silica hydrogel, silicic acid, silicate esters, and sodium silicate are used. As the alumina source, for example, sodium aluminate, aluminum sulfate, aluminum nitrate, alumina sol, activated alumina, $\gamma$-alumina, and $\alpha$-alumina are used. As the alkali source, for example, sodium hydroxide and potassium hydroxide are used. Sodium hydroxide is especially preferable.

The thus-prepared aqueous reaction mixture is formed into a slurry as uniform as possible, and the slurry is charged in a sealed vessel, such as an iron autoclave, a stainless steel autoclave, or a fluorine resin-lined autoclave, where the reaction product is crystallized. The crystallization temperature is 80° C. to 250° C., preferably 140° C. to 200° C., and the reaction time is 5 hours to 30 days, preferably 10 hours to 10 days.

While crystallization is carried out, the reaction mixture is preferably stirred continuously or intermittently to maintain it in a uniform state. The crystallized reaction product is cooled, removed from the sealed vessel, washed with water, filtered and then, if desired, dried.

In the synthesis of the zeolite, various additives may be added to the aqueous reaction mixture, if desired. The additives used include, for example, a quaternary alkyl ammonium ion-containing compound disclosed in U.S. Pat. No. 3,702,886, a primary alkylamine disclosed in U.S. Pat. No. 4,151,189, an alcohol disclosed in British Patent No. 1,553,209, and a carboxyl group containing organic compound disclosed in Japanese Unexamined Patent Publication No. 58-91032.

In the present invention, silver capable of coupling with iodine should be loaded on the pentasil zeolite. Silver can be loaded on the zeolite according to an ion exchange method, an impregnation method, a kneading method and the like, and the loading method is not particularly limited. An ion exchange method is preferable because it provides a uniform dispersion of silver over the entire adsorbent.

Preferably at least 70%, more preferably at least 90% equivalent, of the cation of the starting zeolite is exchanged with the silver. Thus, the amount of silver loaded according to this method is generally 5 to 15% by weight based on the weight of the adsorbent, though the amount of silver loaded varies according to the SiO$_2$/Al$_2$O$_3$ molar ratio in the starting zeolite and other conditions. Ion exchange of the zeolite may be performed either before or after molding thereof.

The adsorbent of the present invention is used after it has been molded into an appropriate shape. In view of the adsorption efficiency, a smaller particle size of the adsorbent is preferable. However, if the particle size is too small, the pressure drop is undesirably increased. Accordingly, it is preferable that the particle size be 0.05 to 10 mm, more preferably, 0.3 to 3 mm. Molding may be performed either before or after ion exchange of the zeolite.

The thus-prepared adsorbent is dried and then calcined, before it is actually used. Drying is carried out at 50° C. to 250° C. for at least 0.1 hour, preferably, 0.5 to 48 hours, and calcination is carried out at 300° C. to 700° C. for at least 0.1 hour, preferably, 0.5 to 24 hours. Calcination is conducted in the open air or in an atmosphere containing an inert gas or hydrogen.

Removal of the iodine compounds by using the adsorbent of the present invention is carried out, for example, under the following conditions.
Temperature: 0° C. to 300° C.
Relative humidity: 0 to 100%
Superficial velocity: 1 to 500 cm/sec The present invention will now be described in detail with reference to the following examples, that by no means limit the scope of the invention.

In the examples, the capacity of the adsorbent was evaluated based on the removal of CH$_3$I by using CH$_3$$^{131}$I as a tracer gas under the following conditions.
Temperature: 30° C.
Relative humidity: 95%
Superficial velocity: 20 cm/sec
CH$_3$I concentration: 0.1 mg/m$^3$
Adsorbent layer: 50 mm (in diameter)×50 mm (in height)

EXAMPLE 1

A zeolite was synthesized according to the method disclosed in U.S. Pat. No. 4,151,189.

A reaction mixture having a composition shown below was prepared from sodium silicate, aluminum sulfate, sodium hydroxide, and n-propylamine as the starting materials. The reaction mixture was charged in an autoclave and crystallized with stirring at an elevated temperature of 160° C. for 72 hours.
SiO$_2$/Al$_2$O$_3$ molar ratio: 50
H$_2$O/SiO$_2$ molar ratio: 40
OH$^-$/SiO$_2$ molar ratio: 0.07
n-Propylamine/SiO$_2$ molar ratio: 0.4

After completion of the crystallization, the product was removed from the autoclave, and then washed with deionized water. The product was filtered and then dried at 110° C. overnight.

The obtained product was a zeolite having an X-ray diffraction pattern shown in Table 1 and an SiO$_2$/Al$_2$O$_3$ molar ratio of 45.5.

TABLE 1

| d(Å) | 100I/Imax |
| --- | --- |
| 11.30 | 58 |
| 10.16 | 45 |
| 3.87 | 100 |
| 3.84 | 78 |
| 3.74 | 60 |
| 3.67 | 34 |

Alumina sol was added as a binder in the thus-obtained zeolite powder in an amount of 15% by weight as calculated as alumina (Al$_2$O$_3$), and the mixture was sufficiently kneaded. The kneaded mixture was molded into particles having a size of 10 to 16 mesh (JIS standard sieve). The particles were dried at 110° C. overnight and then calcined at 500° C. in the presence of air for 2 hours.

The molded zeolite was ion-exchanged with silver by using an aqueous 0.5N solution of silver nitrate. Then, the ion-exchanged zeolite was washed with deionized water, dried at 110° C. overnight, and then calcined in air at 500° C. for 2 hours.

The amount of silver loaded on the ion-exchanged zeolite was 5.9% by weight and the $CH_3I$ removal ratio was 98.8%. The amount of the adsorbent charged in the test apparatus was 60.4 g, and thus the removal ratio per unit amount of silver was 27.7%/g of Ag.

EXAMPLE 2

A zeolite was synthesized according to the method disclosed in Japanese Unexamined Patent Publication No. 58-91032.

A reaction mixture having a composition shown below was prepared from silicic acid, sodium aluminate, sodium hydroxide and tartaric acid as starting materials. A zeolite was synthesized from this reaction mixture in the same manner as described in Example 1.

$SiO_2/Al_2O_3$ molar ratio: 30
$H_2O/SiO_2$ molar ratio: 20
$OH^-/SiO_2$ molar ratio: 0.17
Tartaric acid/$Al_2O_3$: 2.5

The obtained product was a zeolite having an X-ray diffraction pattern shown in Table 2 and an $SiO_2/Al_2O_3$ molar ratio of 25.5.

TABLE 2

| d(Å) | 100I/Imax |
|---|---|
| 11.32 | 54 |
| 10.13 | 39 |
| 3.88 | 100 |
| 3.74 | 52 |
| 3.67 | 30 |

The thus-obtained zeolite powder was molded, calcined, and then ion-exchanged with silver in the same manner as described in Example 1. The zeolite was calcined at 500° C. in air for 2 hours to obtain an adsorbent. The amount of silver loaded on the zeolite was 9.7% by weight, and the $CH_3I$ removal ratio was 99.7%.

The amount of the adsorbent charged in the test apparatus was 61.9 g, and thus the removal ratio per unit amount of silver was 16.6%/g of Ag.

COMPARATIVE EXAMPLE 1

A commercially available X-type zeolite molded product (marketed under the tradename of Molecular Sieve 13X) was pulverized to a size of 10 to 16 mesh and was ion-exchanged with silver by using an aqueous 2.0N solution of silver nitrate. The ion-exchanged zeolite was washed with deionized water, dried at 110° C. overnight, and then calcined at 500° C. for 2 hours.

The amount of silver deposited on the silver-ion-exchanged zeolite was 39.7% by weight, and the $CH_3I$ removal ratio was 81.3%. The amount of the adsorbent charged in the test apparatus was 105.1 g, and thus the removal ratio per unit amount of silver was 1.9%/g of Ag.

COMPARATIVE EXAMPLE 2

Commercially available silica beads (having a diameter of 1 to 2 mm) were impregnated with silver nitrate in an amount of 8% by weight as calculated as silver and then dried at 150° C. for 4 hours. The $CH_3I$ removal ratio of the thus-obtained silver-contained silica adsorbent was 48.3%. The amount of the adsorbent charged in the test apparatus was 60.9 g, and thus the removal ratio per unit amount of silver was 9.9%/g of Ag.

COMPARATIVE EXAMPLE 3

The $CH_3I$ removal ratio of commercially available silver-mordenite (supplied under the tradename of IONEX AgZ-900 by Research Corp.) ($SiO_2/Al_2O_3$ molar ratio=10, particle size=10 to 16 mesh, amount of silver deposited=19.4% by weight) was determined according to the method described in Example 1. The $CH_3I$ removal ratio was 57.3%. The amount of the adsorbent charged in the test apparatus was 87.3 g, and thus the removal ratio per unit amount of silver was 3.4%/g of Ag.

We claim:

1. A method of removing iodine and iodine compounds from a gaseous stream, which comprises passing the gaseous stream containing iodine and iodine compounds through a layer of an adsorbent comprising a silver loaded pentasil zeolite having a silica/alumina ratio in the range of 15 to 100, whereby the iodine and iodine compounds are adsorbed in the zeolite.

2. A method according to claim 1, wherein the adsorbent contains silver in an amount of 5 to 15% by weight expressed as silver and based on the weight of the adsorbent.

3. A method according to claim 1, wherein the pentasil zeolite has a $SiO_2/Al_2O_3$ molar ratio of at least 15.

4. A methods according to claim 1, wherein the pentasil zeolite has a $SiO_2/Al_2O_3$ molar ratio of from 20 to 50.

5. A method according to claim 1, wherein the pentasil zeolite has a particle size of from 0.05 mm to 10 mm.

6. A methods according to claim 1, wherein the pentasil zeolite has a particle size of from 0.3 mm to 3 mm.

7. A method according to claim 1, wherein the pentasil zeolite has been prepared by calcination effected in air.

8. A methods according to claim 1, wherein the pentasil zeolite has been prepared by calcination effected in an inert gas.

9. A method according to claim 1, wherein the pentasil zeolite has been prepared by calcination effected in a hydrogen gas.

10. A method according to claim 1, wherein the silver loaded pentasil zeolite is prepared by an ion exchange method.

11. A method of removing iodine and iodine compounds from a gaseous stream under conditions of high humidity which comprises passing a gaseous stream containing iodine and iodine compounds through a layer of silver loaded pentasil zeolite whereby the iodine and iodine compounds are adsorbed in the zeolite wherein said zeolite contains 5 to 15% weight percent of silver based on the weight of the adsorbent and said zeolite has a $SiO_2/Al_2O_3$ molar ratio of from 15 to 100 and said zeolite has a particle size of 0.05 mm to 10 mm.

* * * * *